United States Patent [19]
Diaz et al.

[11] Patent Number: 6,117,829
[45] Date of Patent: Sep. 12, 2000

[54] DIBASIC ESTER GEL/PASTE COMPOSITION AND USE OF SAME FOR REMOVING POLYSULFIDE AND OTHER CHEMICALS FROM SUBSTRATES

[75] Inventors: Iris Margarita Diaz, Wilbraham; Joel Jeffry Gummeson, Belchertown, both of Mass.; Frank Peter Jakse, Florissant; Terry Calvin Wolfe, Olivette, both of Mo.

[73] Assignee: Solutia Inc., St. Louis, Mo.

[21] Appl. No.: 08/984,136

[22] Filed: Dec. 3, 1997

Related U.S. Application Data

[60] Provisional application No. 60/032,362, Dec. 3, 1996.

[51] Int. Cl.[7] .............................. C09D 9/00; C11D 7/50; C11D 3/43; C11D 3/20
[52] U.S. Cl. ...................... 510/201; 510/202; 510/477; 510/507
[58] Field of Search .................... 510/201, 202, 510/507, 477

[56] References Cited

U.S. PATENT DOCUMENTS

| | | | |
|---|---|---|---|
| 3,796,602 | 3/1974 | Briney et al. | 134/38 |
| 4,780,235 | 10/1988 | Jackson | 252/170 |
| 4,863,525 | 9/1989 | Goel et al. | 134/22.19 |
| 4,927,556 | 5/1990 | Pokorny | 252/173 |
| 5,030,290 | 7/1991 | Davis | 134/4 |
| 5,064,713 | 11/1991 | DuLaney et al. | 428/214 |
| 5,188,675 | 2/1993 | Dormon-Brailsford | 134/4 |
| 5,413,729 | 5/1995 | Gaul | 252/162 |
| 5,712,237 | 1/1998 | Stevens | 510/291 |
| 5,741,368 | 4/1998 | Sahbari | 134/38 |

FOREIGN PATENT DOCUMENTS

| | | |
|---|---|---|
| 2122879 | 5/1994 | Canada . |
| 34 38 399 | 3/1986 | Germany . |
| 9423012 | 10/1994 | WIPO . |

*Primary Examiner*—Yogendra Gupta
*Assistant Examiner*—John M Petruncio
*Attorney, Agent, or Firm*—Thompson Coburn LLP; Gordon F. Sieckmann

[57] ABSTRACT

An essentially non-aqueous cleaning composition and method for using this composition to remove chemicals from substrates, the composition comprising a dibasic ester and a thickening agent which is soluble, swellable or dispersible in said dibasic ester and wherein said thickening agent is present in an amount such that said composition has a numerical ratio of viscosity unsheared to viscosity under shear of at least about 3:1.

21 Claims, 1 Drawing Sheet

DIBASIC ESTER GEL/PASTE COMPOSITION AND USE OF SAME FOR REMOVING POLYSULFIDE AND OTHER CHEMICALS FROM SUBSTRATES

This application claims the benefit of priority under 37 C.F.R. §119(e) of U.S. provisional patent application No. 60/032,362 filed Dec. 3, 1996.

This invention relates to novel non-aqueous dibasic ester compositions and novel use of the same for effectively removing polysulfide and other chemicals from substrates.

BACKGROUND OF THE INVENTION

During some manufacturing processes, manufacturers sometimes apply a chemical which is a protective coating to their product to protect its surface during their product manufacturing process. This protective coating stays on until their product is ready to be shipped from their factory. That protective coating is only a temporary protective coating on the product substrate because that protective coating must be removed toward or at the end of the manufacturing process in an effective manner. This technique is particularly practiced in the aviation industry wherein a protective coating is applied to some exterior and some interior of parts during the early stages of manufacturing of an aircraft. The coating must later be effectively removed prior to a painting stage to avoid fisheyes in a high polished and painted surface.

In other industries, the material is used in service. For example, such protecting chemical is a polysulfide based material, usually sold with an activator. The polysulfide-based material is applied to the metal part after premixing with a recommended amount of activator, for example, and the polysulfide cured for a time to provide the protective sealant.

In other instances, one may simply desire to remove a chemical of some kind from a substrate containing that chemical on its surface simply because a different chemical is desired to be placed upon a cleaned substrate or perhaps that user does not desire to apply a second chemical over a first chemical on that substrate. In all cases, the effective removal of a chemical residing on the surface of the substrate from the surface in a manner which does not harm the substrate is desired. In some instances, a user will have a tougher chemical removal task as he will wish to remove one or more layers of chemicals on the surface of a substrate. In some instances, that removal task is more daunting as the user may have a substrate which has at least one layer of a chemical resident on the surface of a substrate for a period of years.

Several U.S. patents describe prior art processes and compositions for removal of chemicals from surfaces.

For example, U.S. Pat. No. 5,413,729 discloses a composition used to remove coating from substrates comprising at least one lactone and at least one ester. This composition is reported to optionally contain water, aromatic solvents, organic solvents, surfactants, thickeners, corrosion inhibitors, fragrances and/or other additives (see col. 3, lines 7–12). Esters can be dibasic acid esters (col. 3, lines 44–55). This composition is reported to be applied easily, level out and have the ability to cling to vertical surfaces as disclosed in column 4, lines 27–44. Column 3, lines 63–68 of this patent discloses that adding water to the composition unexpectedly results in little reduction in the overall effectiveness of the lactone/ester composition. While Example 6 discloses a composition that does not have water present, this patent clearly teaches that it is advantageous to use water in the composition of the patent.

U.S. Pat. No. 4,927,556 discloses a composition containing at least one dibasic ester (both dimethyl and diethyl esters are suitable), water and at least one thickening agent (col. 1, line 67- col 2, line 5). The amount of water required is at least 55% by weight (col. 2, lines 15–16). Thickening agents which must be soluble in water or swellable in water allow the composition to be applied easily, level out and have the ability to cling to vertical surfaces are disclosed in column 3, lines 17–32. This patent discloses that, while the dibasic esters are known to be capable of removing paint by themselves, their lower viscosities rend them unsuitable for use on vertical surfaces (col, 4, lines 1–3). This patent also discloses that the presence of water allows the expensive dibasic esters to be used as a paint remover (col. 4, lines 15–17). This patent teaches away from using non-aqueous compositions.

Canadian Patent 2,122,879 discloses a method for removing coating films from surfaces by pressure spraying a chemical stripping composition onto the surface, allowing the stripping composition to strip the coating from the surface, and removing the mixture of stripping composition and coating by applying a vacuum. The stripping composition can be a composition comprising NMP, d-limonene, dimethyl glutarate, dimethyl adipate, dimethyl succinate, and the remaining consisting of a surfactant. This patent discloses that the stripping compositions needs to be of such a consistency so as to coat surfaces with minimal runs and drips, i.e., the compositions need to be modified with a bonding agent such as hydroxyethyl cellulose.

This use of water in the above-reported compositions is not acceptable for many substrates including metals and wood, and is also believed to be a major factor in causing hydrolysis of the dimethyl ester, an undesirable situation. For many situations, water is unacceptable because of its corrosion potential. A thickened, non-aqueous dibasic ester composition which effectively removes chemicals from such substances is highly desirable. There is a high desirability to replace materials highly volatile, toxic materials such as MEK (methyl ethyl ketone), 111 -trichlorethane and the like.

OBJECTS OF THE INVENTION

It is an object of the invention to provide a non-aqueous composition and method for its use for effectively removing polysulfide from a substrate.

Yet another object of this invention is to provide a non-aqueous composition for the effective removal of polysulfide from a surface without significant damage occurring to that surface.

It is another object of the invention to provide an effective composition and method for removing sealant from the surface of an aircraft such that the sealant will substantially fall off overhead surfaces in approximately one day.

It is still another object of this invention to provide a composition which will remove sealants, alkaline sealants, soil, grease/oil, that has low toxicity, is non-flammable, has a high boiling point, e.g., lower volatile organic content release, and is a biodegradable composition.

It is yet another object of this invention to provide a composition which has general metal and composite cleaning properties.

These and other objects are met in the invention which is hereinafter described more particularly in detail.

BRIEF SUMMARY OF THE INVENTION

This invention relates to a substantially non-aqueous composition comprising a dibasic ester and a thickening agent useful to remove a chemical such as a polysulfide or sealant and the like from a substrate. Use of this composition involves the softening and swelling and consequently easier removal of the polysulfide or sealant material residing on the substrate and which is desired to be rendered removable and/or removed.

DETAILED DESCRIPTION OF THE INVENTION

Figure 1:
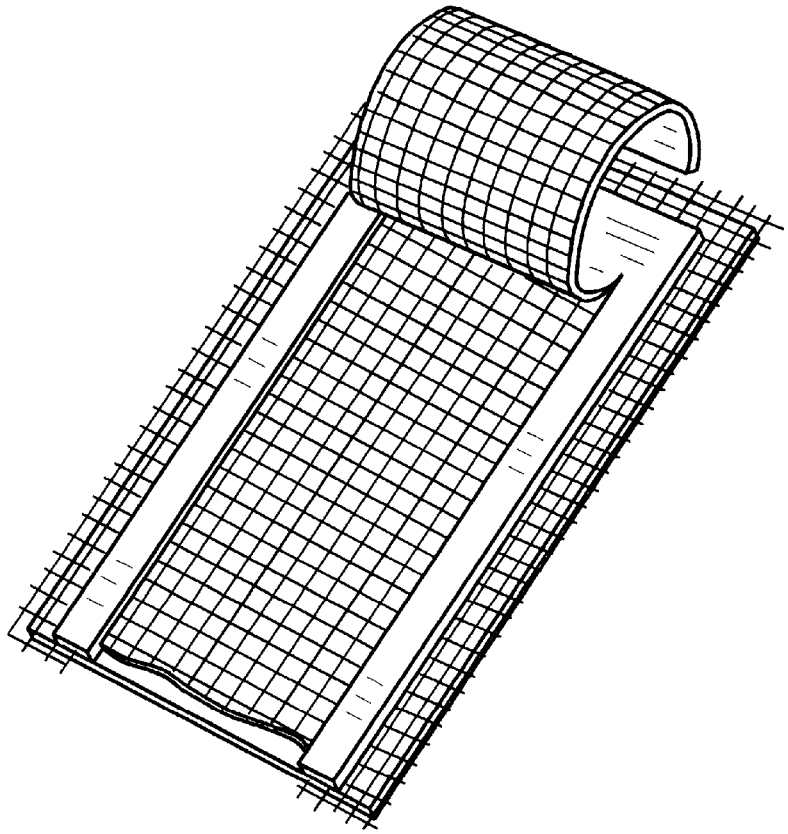
FIG. 1 shows a coupon (substrate) containing a polysulfide coating on an aircraft aluminum (alloy) substrate from which the peel testing device has pulled back the fiberglass net. Note that for FIG. 1, the polysulfide coating was not removed when the peel device pulled the fiberglass net back, indicating that the polysulfide coating remained on the substrate in the absence of a composition of this invention to remove it or to render it removable.

This invention provides a substantially non-aqueous low-toxicity, non-flammable composition for rendering chemical coatings removable from substrates and/or removing or separating such chemicals from the substrates.

An essentially non-aqueous composition which comprises a dibasic ester and a thickening agent which is soluble, swellable or dispersible in said dibasic ester and wherein said thickening agent is present in an amount such that said composition has a numerical ratio of viscosity unsheared to viscosity under shear of at least about 3:1.

The composition is preferably an essentially non-aqueous cleaning composition useful for the removal of a chemical present on a substrate or for rendering such chemical removable wherein said chemical is selected from the group consisting of elastomeric and thermoset coatings where the degree of cross-linking is minimal, polysulfide, sealants, temporary protective coating(s), epoxy, acrylic, paint, varnish, mixtures thereof and the like from the surface of said substrate which is selected from the group consisting of ceramic, wood, glass, polyethylene, polypropylene, epoxy resin, fluorocarbon resin, nylon, and metal wherein said composition comprises a dibasic ester or mixture of dibasic esters having a carbon number in the main carbon body from about 4–6 and a thickening agent selected from the group consisting of fumed silica, clays, fatty acids, waxes, microgels, polyacrylates, polyols, ionomers, polyisocyanates, polysaccharin, polyamides and mixtures thereof and the like in an amount sufficient such that said composition has a numerical ratio of viscosity unsheared to viscosity under shear of at least about 3:1 and preferably of at least about 20:1 and more preferably of at least about 40:1.

The amount of dibasic ester or esters in the composition must be sufficient to effectively remove chemical coatings from the desired substrates to be cleaned.

The amount of thickening agent or agents in the composition of this invention must be sufficient to form a dibasic ester component composition having a desired paste or gel texture. The amount of thickening agent necessary to achieve the paste or gel texture will depend on the specific thickening agent(s) used. Typically, the amount of thickening agent present in a composition of this invention is in the range from about 0.5% to about 20%, preferably about 3% to about 15%, by weight of the total composition. A preferred amount of thickening agent present in a composition of this invention when the thickening agent is a silica is in the range from about 3 to about 12%. Those of skill in the art will recognize that greater or lesser amounts of thickening agent may be suitably employed based upon an appropriate choice of a different yet acceptable thickening agent. For example, when the thickening agent employed is Bentone SD-2 (an organically modified montmorillonite clay having the texture of a cream powder with a specific gravity of 1.62) then the amount of thickening agent Bentone SD-2 typically employed will be in the range from about 8% to about 10% by weight of the total composition.

When the thickening agent employed is Thixcin®R then a preferred amount of Thixcin®R trihydroxystearin, a white fine powder, specific gravity 1.02 available from Rheox, is in the range from about 2.5 to about 6. In this instance, it is preferable to heat to a temperature from about 40° C. to about 50° C. during mixing to improve dispersion.

In using the composition of this invention one must allow the composition of this invention to adhere to surfaces (particularly vertical surfaces or horizontal inverted surfaces), which are the chemicals to be removed or rendered removable, for a sufficiently long period of time to insure that the dibasic ester will have sufficient duration of contact with the chemical to allow removal of same. The amount of time which is needed for such sufficient contact is not critical but will range from about one hour to about twenty four hours although greater or lesser times may be employed. Those of skill in the art will be able to readily determine the time required after reading this specification and observing the removal of the chemical or the rendering a chemical removable from the substrate by a composition of this invention.

The compositions of this invention are effective on a wide range of coatings and substrates. The composition is useful for removing chemicals from substrates which are not adversely effected by contact with a dibasic ester and include without limitation ceramic, wood, glass, polyolefins, fluorocarbon resin, nylon, metal, polymers that are chemically resistant to dibasic esters, mixtures thereof and the like. A particularly preferred substrate is a metal such as aluminum or titanium. A more preferred metal is an alloy.

The composition of this invention is effective for the removal of a wide range of chemicals from the above-mentioned substrates. Illustrative non-limiting chemicals which may be effectively removed by a composition of this invention from a substrate include elastomeric and thermoset coatings where the degree of cross-linking is minimal, polysulfide, polysulfide ethers, sealants, temporary protective coating(s), oils, epoxy, acrylic, paint, hydrocarbon residues, soil, varnish, soot, exhaust chemicals, mixtures thereof and the like from the substrate. The term "exhaust chemicals" includes without limitation the exhaust soot discharged by engines including aircraft, car and locomotive engines. Examples of sealants which may be effectively removed from a substrate by the composition and method of this invention comprises those chemicals sold as Acryl L R which is a seam sealer commercially available from Schnee-Morehead, Inc.; Aluminum RTV 104 which is available from the General Electric Company and which comprises a silicone rubber adhesive sealant for general purposes which contains polydimethylsiloxane; Blue Silicone which is an RTV gasket sealer from Permatex Loctite Company of Hartford, Conn.; and Sensor Safe Ultra Copper, a high-temperature TV silicone gasket material from Permatex Loctite Company. These commercial sealers may be effectively removed from a metal (such as cold-rolled steel with or without an electrodeposition primer, aluminum and the like) substrate employing a composition of this invention.

By admixing the dibasic ester or esters with an effective amount of thickening agent as herein described, the composition formed thereby remains stable and the effectiveness of the dibasic ester or esters as a solvent remains. Preferred compositions of this invention will have typically the consistency of a gel or paste depending on the amount of thickening agent employed in a composition used to practice this invention. Those of skill in the art will recognize that the amount of energy imparted to the composition formed during the admixing of the disbasic ester and the thickening agent will determine somewhat the consistency of the resulting composition of this invention. In some instances, the preferred amount of admixing employed is that amount which just results in the gel or paste texture of the composition and the use of excess admixing energy may result in a loss of the advantages of compositions of this invention as the resulting composition may depart from the gel or paste texture into a liquid.

Illustrative non-limiting dibasic esters that can be used in the composition of this invention include, but are not limited to, those aliphatic diesters having a molecular weight of up to about 200. If desired, more than one dibasic ester can be used in the compositions of this invention. These diesters are well-known in the art and are commercially available.

Illustrative non-limiting dibasic esters that are preferred for use in the composition of the present invention are esters derived from adipic acid ($COOH(CH_2)_4COOH$), glutaric acid ($COOH(CH_2)_3COOH$), and succinic acid ($COOH(CH_2)_2COOH$). If desired, two or more of the esters of these acids can be employed in the composition of this invention, and even all three of the esters of these acids as a mixture can be employed in the composition of this invention. If desired, other esters including diethyl esters and dibutyl esters of these acids can be used effectively in the composition of this invention.

Without being bound by theory, it is believed that the purpose of the thickening agent or agents is to stabilize the composition of this invention and provide good flow control, i.e., the presence of a thickening agent allows the composition to be applied easily, level out, and have the ability to cling to vertical and/or inverted horizontal surfaces or rotating surfaces for a time sufficient to be effective.

Illustrative non-limiting thickening agents that are preferred for the composition of the present invention include both chemical and associative thickeners such as fumed silica, clays, fatty acids, waxes, microgels, polyacrylates, polyols, ionomers, polyisocyanates, polysaccharin, polyamides and mixtures thereof which are present in an amount sufficient such that said composition has a numerical ratio of viscosity unsheared to viscosity under shear of at least about 3:1, preferably at least about 20:1, and more preferably at least about 40:1. One or more thickeners may be employed in a composition of this invention.

As employed herein, the term "numerical ratio of viscosity unsheared to viscosity under shear" means that numerical ratio of the viscosity of a composition measured on any conventional viscometer operated at a low revolution(s) per minute (rpm) of the viscometer to the ratio of viscosity of a composition when the rpm of the same viscometer is a factor of ten times higher than its rpm at low speed. One measure used is the thixotropic index which is the ratio of Brookfield viscosity at a low speed to the viscosity at 10 times that speed. The applicable viscometers to be used are readily known to those skilled in the art. The specific viscometer used will depend on the viscosity of the thickened product. The viscosity of materials that may be very highly viscous, e.g., a ratio greater than about 50:1, may necessitate the use of a viscometer capable of measuring very high viscosities.

Suitable non-limiting examples of thickening agents preferred for use in compositions of this invention include the family of organo-modified clays like Bentones, available from Rheox, (bis(hydrogenated tallow alkyl)dimethyl such as Bentone 34) and bentonite. Other Bentones which may be employed herein include Bentone 27 and Bentone 38. However, these latter Bentones will generally require an activator to be employed therewith. Illustrative but non-limiting activators useful with such typical Bentones include methanol, glycerin, organic solvents with polar groups, mixtures thereof and the like. Illustrative amounts of such activators useful herein are typically in the range from about 0.5% to about 15% and more preferably in the range from about 1% to about 5% percent by weight of the thickening agent.

Suitable non-limited examples of thickening agents useful in composition of this invention include silica such as fumed and precipitated silica mixtures thereof and the like and fatty acids derivatives (castor oil derivatives and hydrophobic hydrotalcite) mixtures thereof and the like. Examples of silica include Cab-O-Sil. Examples of fatty acid derivatives include Thixcin®R, a castor oil derivative.

Other suitable thickening agents include: waxes, microgels and the like, acrylates/polyacrylates, ionomers such as methacrylic acid and sulfonated polystyrene 4-vinylpyridine, polyols such as polyisocyanate-polyol, polyisocyanates, polysacharides like cellulose (carboxymethyl cellulose) derivatives and polyamides such as PEG 300 lauryl amide, imidazolines such as tall oil hydroxyethyl imidazoline (CTFA) or 4,5-Dihydro-7-nortalloil-1H-imiddazole-1-ethanol, mixtures thereof and the like.

Typical clays which are useful herein include those materials which are characterized as fine-grained, firm, earthy material that is plastic when wet and hardens when heated, consisting primarily of hydrated silicates of aluminum and widely used in making bricks, tiles, and pottery.

Preferable clays useful herein include Bentone SD-2, Bentone 27 and Bentone 38.

Illustrative silicas useful in compositions of this invention include compositions containing $SiO_2$ and include those compounds which are typically a white or colorless crystalline compound, occurring abundantly as quartz, sand, flint, agate, and many other minerals and used to manufacture a wide variety of materials, especially glass and concrete.

Preferred silicas include fumed silicas.

Illustrative waxes which may be employed in compositions of this invention include naturally occurring esters of fatty acids and monohydric alcohols, both natural and manufactured products resembling these esters.

Illustrative fatty acids that may be suitably employed as thickeners in compositions of this invention include any of a large group of monobasic acids, especially those found in animal and vegetable fats and oils, having the general formula $C_nH_{2n+1}COOH$. These fatty acids are characteristically made up of saturated or unsaturated aliphatic compounds with an even number of carbon atoms, this group of acids includes palmitic, stearic, and oleic acids, mixtures thereof and the like.

Useful fatty acids include the saturated and unsaturated branched and straight chain fatty acids having a carbon number from about 2 to about 20, mixtures thereof and the like.

Useful typical animal waxes include sperm oil, a liquid wax from the sperm whale, and spermaceti, a solid constituent refined from sperm oil; lanolin, or wool grease, the principal constituent of the natural wool fat of sheep and Chinese wax, a secretion of insects, vegetable waxes such as those which occur on the exposed surfaces of many plants, ambergris which is a wax found in sperm whales, paraffin wax which is a mixture of saturated hydrocarbons of high molecular mass, produced during the refining of petroleum. Those of skill in the art will recognize that mixtures of waxes may be employed in this invention if desired.

The thickening agents that are most preferred are the organo-modified clay derivatives, silicas and castor oil or fatty acid derivatives.

Those of skill in the art will recognize that mixtures of various thickeners may be employed in compositions of this invention.

Those of skill in the art will also recognize that an additional solvent may be employed in compositions of this invention. Typical illustrative non-limiting additional solvents include those solvents compatible with a dibasic ester, preferably having good solubility.

The amount of additional solvent which may be included in a composition of this invention is preferably in the range from 0 to about 95 wt. percent based on the overall composition and more preferably from 0 to about 80, although greater or lesser amounts may be employed if desired.

The amount of dibasic ester or esters must be sufficient to insure effective removal of the undesirable material from substrates. While illustrative examples are provided herein of suitable illustrative compositions, the ranges of components in those examples are merely suggestive and those of skill will be able to adjust the amount of dibasic ester or esters, thickening agents and amount of thickening agent depending somewhat on the temperature at which a composition of this invention is employed as well as the particular chemical being removed from a particular substrate.

The composition of this invention can be prepared by first adding thickening agents to the dibasic ester in an admixing process or admixing dibasic ester or esters with the thickening agent(s). The order of addition is not critical. The amount of mixing needed to achieve uniformity of the resulting compositions will vary according to the particular chemicals and thickening agents employed. However, the product will not possess the requisite thickening property if excessive agitation (time and speed) is applied. Those of skill in the art will be able to arrive at the necessary amount of mixing from reading this specification and recognizing that a good mix of the dibasic ester(s) with the thickening agent is required for the effective practice of this invention. The resulting composition may have the physical properties of a gel or paste depending on the amount of thickening agent employed. If the resulting composition is too liquid, it may be necessary to add additional thickener to bring the resulting admixture to the desired gel or paste consistency or texture or to make a new composition.

Use of a composition of this invention is accomplished by preparing a composition of this invention as described above and thereafter applying that composition to a chemical which is present on a substrate from which the chemical is to be effectively removed or rendered removable. The application method employed in applying a composition of this invention to the chemical is not particularly precise as those of skill in the art will recognize that any effective application method will suffice, for example, brushing, rolling, spreading (as with a trowel), pasting, wiping, airless application, spraying and the like which can be carried out by any readily available mechanical means. Those of skill in the art will recognize that maximum removal of such chemical is enhanced by the application of a uniform well-distributed application of the composition of this invention to the chemical to be removed or rendered removable.

Preferably in using this invention an external coat of the composition of this invention can be brushed or sprayed or otherwise applied preferably in a uniform manner to the surface to be cleaned. The actual time of the removal process depends somewhat on the condition of the surface to be cleaned the chemical to be removed and the temperature at which the surface to be cleaned is exposed. If desired, a composition of this invention can be sprayed into the interior of a vessel or tank, the sprayed surface can then be left undisturbed for a time to allow the composition to soften and loosen the chemical to be removed from the substrate, and the chemical can be removed from the vessel after a sufficient time.

Aviation services and maintenance operations typically require that chemicals used to clean their aircraft equipment, e.g., fuel tanks, should remove the polysulfide sealant which had previously been applied to such equipment without any damage to the aircraft metal. Therefore, only non-metallic scrapers (formica or lexan) can be used to clean aircraft equipment. The disadvantage of using these objects is that a lot of aggressive force must be applied which could damage the aircraft's aluminum. Besides, it is costly since it is a very time-consuming task.

The value of using the composition of this invention is that it not only removes the polysulfide, but it causes no damage to the surface and avoids water in this composition. In addition, a clean metal is obtained in an efficient time compared to the conventional way of performing this cleaning job.

Application temperature is a parameter that significantly increases the rate of a protective coating's (sealant) removal. At higher temperatures, the rate of migration of a composition of this invention into the sealant is significantly increased. An increased level of the composition of this invention at the interface causes the sealant to be released from the aircraft metal. Under these conditions, sealant has been observed to substantially fall off overhead surfaces in approximately sixteen hours.

Examples are provided hereinafter which serve to illustrate several features of the invention and its use. All parts are in parts by weight and all percents are in percent by weight unless otherwise stated.

EXAMPLES

Example 1

Panels made of AL7075-T6 aluminum, of about 3 inches by 5 inches dimension, were used in this Example as illustrative substrate(s). A sufficient amount of a polysulfide protective chemical coating made of about 100 grams of polysulfide P/S 870-2A from Cortauld Aerospace with its companion activator of about 15 grams was applied to each panel so that a protective polysulfide chemical coating resided on each panel. This chemical coating was illustrative of a chemical to be removed from a substrate by a composition and method of this invention.

A total of 16 panels were employed in this test. A sealant thickness of ⅛" was applied using a leveling tool. The panel was placed on a release paper for easy cleaning. Once the panels were coated but prior to curing, the fiberglass net (similar to that used in auto body repair or drywall joints) was installed.

The fiberglass net has to be pressed down little by little until the thick polysulfide mixture passes through the small holes and squares of the fiberglass net. The fiberglass net is employed in this Example so that the chemical coating can be removed by an objective mechanical device which provides quantitative peel strength data for this Example. The fiberglass net must be positioned within the chemical coating so that the machine employed herein in lieu of human removal of the chemical coating can have a "hold" on the chemical coating.

Samples comprising these panels with the above-described polysulfide protective chemical coating were cured for about four hours in an oven at 55° C. A pan of water was also placed in this oven to accelerate the curing process.

Samples were removed from the oven when curing was judged to be complete. Next compositions illustrative of this invention were made comprising dibasic ester (Monsanto SkyKleen™ 1000 Aviation Solvent) and various amount of thickening agent as a gel and/or paste. Both Cab-O-Sil fumed silica (hand mixed) and Thixcin® R, mixed with a high shear dipersator from Premier Mill, were employed herein as illustrative thickening agents.

Paste compositions were applied to the sealant samples to a thickness of about ⅛ inch by an applicator.

Samples were equilibrated at constant room temperature and humidity which is about 72° F. and about 50% relative humidity. All of the dibasic methyl ester liquid samples flowed off the surface of the sealant so that re-application was done with more liquid dibasic methyl ester.

The peel testing portion of this test was done next. The samples were cleaned and tested randomly. The procedure for getting the sample ready to be tested in the peeltester described hereinafter comprised: (a) cut/trim the excess of the film from the net, (b) score the film using the scoring applicant, and (c) reinsure the score lines by using a razor blade to completely cut the polysulfide film all the way to the metal. Using a razor blade, initiate the peeling of the film and insert a sample in the peel instrument. Place the net in the upper fixture for pulling and secure the fiberglass net.

A mechanical test device was used to measure peel adhesion strength between the sample and its substrate. The device consists of a screw-driven platform which is moved up or down at a constant rate. Samples are mounted on the platform with one end free. In the test, the free end of the sample is held above the platform at a 90 degree angle to the platform by a pneumatic grip. The grip is coupled to a load-sensing device at the top of the instrument. The platform is then driven down at 5 inches per minute, and the sample subsequently is peeled from the substrate with the load measured throughout the peel process. The horizontal platform is free to move from side to side so that the 90 degree peel geometry is constant throughout the test. An average peel load is calculated and reported for each sample.

The following results were noted for this peel testing:

| Sample | I.D. | Grams of Cleaner | % Thickener | Peel (N/cm)* | Comments |
|---|---|---|---|---|---|
| Control | A1 | — | — | 13.86 | Clean pull. |
|  | A2 | — | — | Cohesive failure | Film stuck to the metal. |
|  | A3 | — | — | Cohesive failure | Film stuck to the metal. |
| SkyKleen™ | B1 | 15.0 | 0.0 | Cohesive failure | Film stuck to the metal. |
| Aviation | B2 | 15.0 | 0.0 | 11.45 | Clean pull. No curled in. |
| Solvent | B3 | 15.0 | 0.0 | 4.93 | Clean pull. Liquid reapplied. |
| Gel | C1 | 16.1 | 7% | Cohesive failure | Film stuck to the metal. |
|  | C2 | 16.1 | 7% | 3.02 | Clean pull. |
|  | C3 | 16.1 | 7% | 6.07 | Clean pull. |
| Paste | D1 | 16.5 | 9% | 3.06 | Clean pull. |
|  | D2 | 16.5 |  | 6.03 | Clean pull. |
|  | D3 | 16.5 |  | Cohesive failure | Film stuck to the metal. |
| Thixcin™R | E1 | 15.7 | 4.5 | 3.27 | Clean pull. |
|  | E2 | 15.7 |  | 1.89 | Clean pull. |

*Where N/cm equals Newtons/centimeter.

FIG. 1 is a drawing which shows a coupon containing a chemical coating on a metal substrate (A2) from which the peel testing device has pulled back the fiberglass net. Note that for FIG. 1, the chemical coating was not removed when the peel device pulled the fiberglass net back, indicating that the chemical coating remained on the substrate in the absence of a composition of this invention to remove it or to render it removable.

Figure 2:
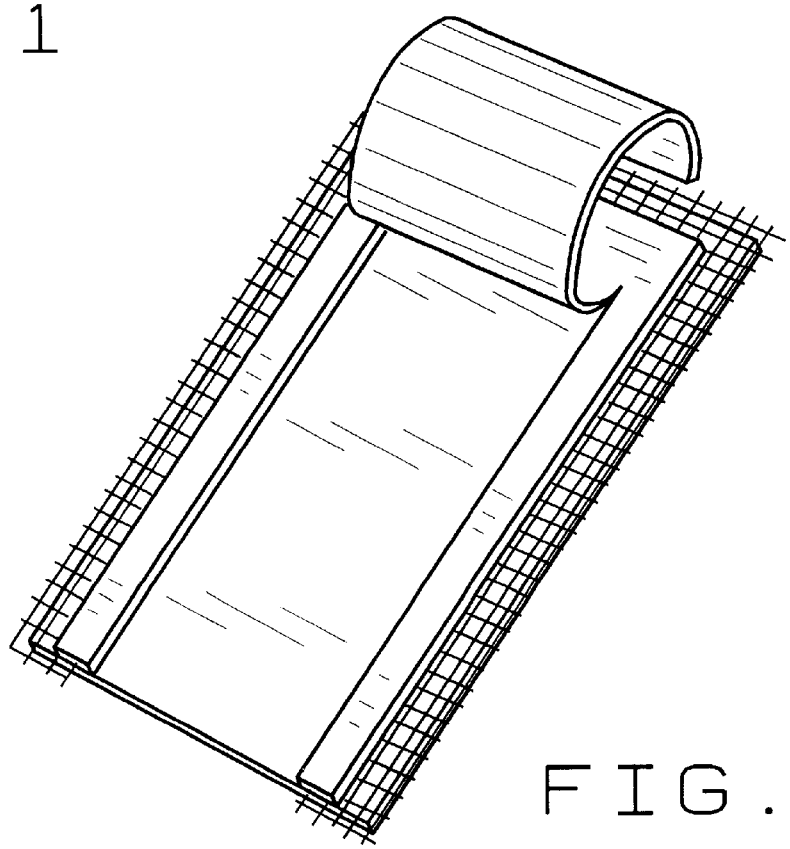
FIG. 2 shows a coupon (substrate) from which the protective polysulfide coating has been effectively removed and rendered removable by a composition of this invention using the method of this invention to carry out such removal.

FIG. 2 shows a substrate (D2) from which the protective polysulfide coating has been effectively removed and rendered removable by a composition of this invention using the method of this invention to carry out such removal.

The results illustrate that samples treated with compositions of the invention required less force to remove than samples treated with liquid or untreated.

Example 2

A composition comprising dibasic methyl ester (Monsanto SkyKleen™ 1000) and using Cab-O-Sil (fumed silica from Cabot illustrative of a thickening agent) which comprised about 7% by weight fumed silica. This sample had the texture of a gel.

A panel made of aluminum (Al7075) metal and judged to be representative of an airplane fuel tank access panel was used as an illustrative substrate. The above-described gel composition was applied to the panel. The panel was put upside down over a small pedestal on a baking dish and put in an oven. The panel was held at 42° C. for about 21 hours. The baking dish containing the panel was covered with aluminum foil. This panel was selected to present a challenge to the composition and method of this invention as the panel was represented to have been about seven years old and contained at least two protective coatings.

The sample was checked after about 4.5 hours. Some of the gel was getting dry and was cracking and some pieces were falling down. This shows that if level of thickener is too high and dries too long it will become crumbly and fall off surface. The aluminum cover was tightened on the baking dish using a rubber band and the baking dish was returned to the oven for further heating.

The following was observed.

Initially upon removal from the oven (at the start of time) the film from the middle part of the panel had lifted up. The sealant film was scraped with a Lexan (R) plexiglass scraper.

After scraping for about 5 minuts total, the film in the middle was completely removed. After a total of about ten minutes of scraping, the coating was removed from about the dome nuts. After a total scraping time of about 30 minutes, about all of the film surrounding the bolts was removed. The film was soft but it was hard to scrape it using the scraper tool.

The previously described composition illustrative of this invention was re-applied using more paste on the panel. After about one hour, about 95% of the remaining film was removed.

The results illustrate that a composition of this invention using a method of this invention successfully removed and rendered removable a seven-year old two-layer protective chemical coating on an aircraft aluminum metal part.

Example 3

Test of a Composition of This Invention to Remove Acrylic Coating

A composition of this invention comprising about 8.5% wt. Cab-O-Sil and the remainder dibasic ester was wiped on an aluminum panel containing an AZTEC AZ644 acrylic chemical coating. About 25 minutes later, this composition and the coating of AZTEC AZ664 was wiped off with a towel to provide a clean surface.

In summary, a novel and unobvious composition utilized to remove coatings has been described. Although specific embodiments and examples have been disclosed herein, it should be borne in mind that these have been provided by way of explanation and illustration and present invention is not limited thereby.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An essentially non-aqueous composition consisting essentially of a dibasic ester and a thickening agent which is soluble, swellable or dispersible in said dibasic ester and wherein said thickening agent is present in an amount such that said composition has a numerical ratio of viscosity unsheared to viscosity under shear of at least about 3:1.

2. The composition of claim 1 wherein said numerical ratio of viscosity unsheared to viscosity under shear is at least about 20:1.

3. The composition of claim 2 wherein said thickening agent is selected from the group consisting of alumina, silica alumina, titania, silica, organomodified clays, fatty acids, waxes, microgels, polyacrylates, polyols, ionomers, polyisocyanates, polysaccharin, polyamides and mixtures thereof.

4. The composition of claim 1 wherein said dibasic ester comprises a mixture of esters of adipic acid, glutaric acid and succinic acid.

5. The composition of claim 1 wherein said thickening agent present in said composition is fumed silica.

6. The composition of claim 1 wherein said composition is a chemical removing composition useful for the removal of a chemical present on a substrate.

7. An essentially non-aqueous cleaning composition useful for the removal of a chemical present on a substrate wherein said chemical is selected from the groups consisting of elastomeric and thermoset coating where the degree of cross-linking is minimal, polysulfide, sealants, temporary protective coating(s), epoxy, acrylic, paint, varnish and mixture thereof from the surface of said substrate which is selected from the group consisting of metal, ceramic, wood, glass, polyolefin, fluorocarbon resin, nylon, and metal wherein said composition consists essentially of a dibasic ester wherein the number of carbon atoms in the corresponding dicarboxylic acid is from about 4 to about 6 and a thickening agent selected from the group consisting of fumed silica, alumina, silica alumina, titanium, clays, fatty acids, waxes, microgels, polyacrylates, polyols, ionomers, polyisocyanates, polysaccharin, polyamides and mixtures thereof wherein said thickening agent is present in an amount sufficient such that said composition has a numerical ratio of viscosity unsheared to viscosity under shear of at least about 3:1.

8. The composition of claim 7 wherein said dibasic ester is selected from the group consisting of adipic acid, glutaric acid, succinic acid and mixtures thereof and said thickening agent is organo-modified clay, precipitated silica or fumed silica.

9. A method of removing a chemical residing on the surface of a substrate and/or rendering said chemical removable comprising:

(a) providing a composition useful for the removal of a chemical present on a substrate or rendering a chemical removable from said substrate, wherein said composition consists essentially of a dibasic ester and a thickening agent which is soluble, swellable or dispersible in said dibasic ester and wherein said thickening agent is present in an amount such that said composition has a numerical ratio of viscosity unsheared to viscosity under shear of at least about 3:1.

10. The method of claim 9 wherein said numerical ratio of viscosity unsheared to viscosity under shear is at least about 20:1.

11. The method of claim 9 wherein said thickening agent is selected from the group consisting of fumed silica precipitated silica, organomodified clays, alumina, silica aluminia, titania, fatty acids, waxes, microgels, polyacrylates, polyols, ionomers, polyisocyanates, polysaccharin, polyamides and mixtures thereof.

12. The method of claim 10 wherein said chemical is selected from the group consisting of polysulfide, sealants, temporary protective coating(s), epoxy, acrylic, paint, varnish, greases, oils, and mixtures thereof.

13. The method of claim 9 where in step 1(a), said substrate is selected from the group consisting of metal, coated metal ceramic, wood, glass, polyolefins, fluorocarbon resin, nylon and mixtures thereof.

14. A method of removing a chemical residing on the surface of a substrate comprising:

(a) a composition useful for the removal of a chemical present on a substrate wherein said chemical is selected from the group consisting of elastomeric and thermoset coatings wherein the degree of cross-linking is minimal, polysulfide, sealants, temporary protective coating(s), epoxy, acrylic, paint, varnish, oils, greases, carbon, and mixtures thereof from the surface of said substrate which is selected from the group consisting of metal, coated metal ceramic, wood, glass, polyolefin, fluorocarbon resin, nylon, elastomeric and thermoset coatings wherein the degree of cross-linking is minimal, and metal wherein said composition consists essentially of a dibasic ester wherein the number of carbon atoms in the corresponding dicarboxylic acid is from about 4 to about 6 and a thickening agent selected from the group consisting of fumed silica, alumina, silica alumina, titania, clays, fatty acids, waxes, microgels, polyacrylates, polyols, ionomers, polyisocyanates, polysaccharin, polyamides and mixtures thereof and in an amount sufficient such that said composition has a numerical ratio of viscosity under shear to viscosity unsheared of at least about 3:1;

(b) applying said composition to a chemical present on the surface of a substrate which is capable of being removed;

(c) allowing said composition to remain on said chemical for a sufficient effective period of time to swell and soften said chemical rendering it capable of being removed; and (d) separating said chemical from said substrate to provide its desired removal.

15. The method of claim 14 wherein said substrate is made of metal and said chemical is polysulfide.

16. The method of claim 15 wherein said chemical is polysulfide and said metal is an alloy.

17. The method of claim 16 wherein said chemical is polysulfide and said alloy is coated with a topcoat or primer paint.

18. The composition of claim 7 wherein said chemical is selected from the group consisting of elastomeric and thermoset coatings where the degree of cross-linking is minimal, polysulfide, sealants, temporary protective coating(s), epoxy, acrylic, paint, varnish and mixtures thereof.

19. The composition of claim 7 wherein said substrate is selected from the group consisting of polymers chemically resistant to dibasic ester(s), metal, ceramic, wood, glass, polyolefins, fluorocarbon resin, nylon and mixtures thereof.

20. The composition of claim 3 wherein said silica comprises precipitated silica.

21. The method of claim 11 wherein said thickening agent is precipitated silica.

* * * * *

UNITED STATES PATENT AND TRADEMARK OFFICE
CERTIFICATE OF CORRECTION

PATENT NO. : 6,117,829
DATED : 09/12/00
INVENTOR(S) : Diaz et al

It is certified that error appears in the above-identified patent and that said Letters Patent are hereby corrected as shown below:

In column 10, line 19, please add the symbol "%" after the number "4.5".
In column 12, line 8, please add the phrase, "precipitated silica" after the phrase, "fumed silica".

Signed and Sealed this

Twenty-ninth Day of May, 2001

Attest:

NICHOLAS P. GODICI

*Attesting Officer*     *Acting Director of the United States Patent and Trademark Office*